Figure 1:
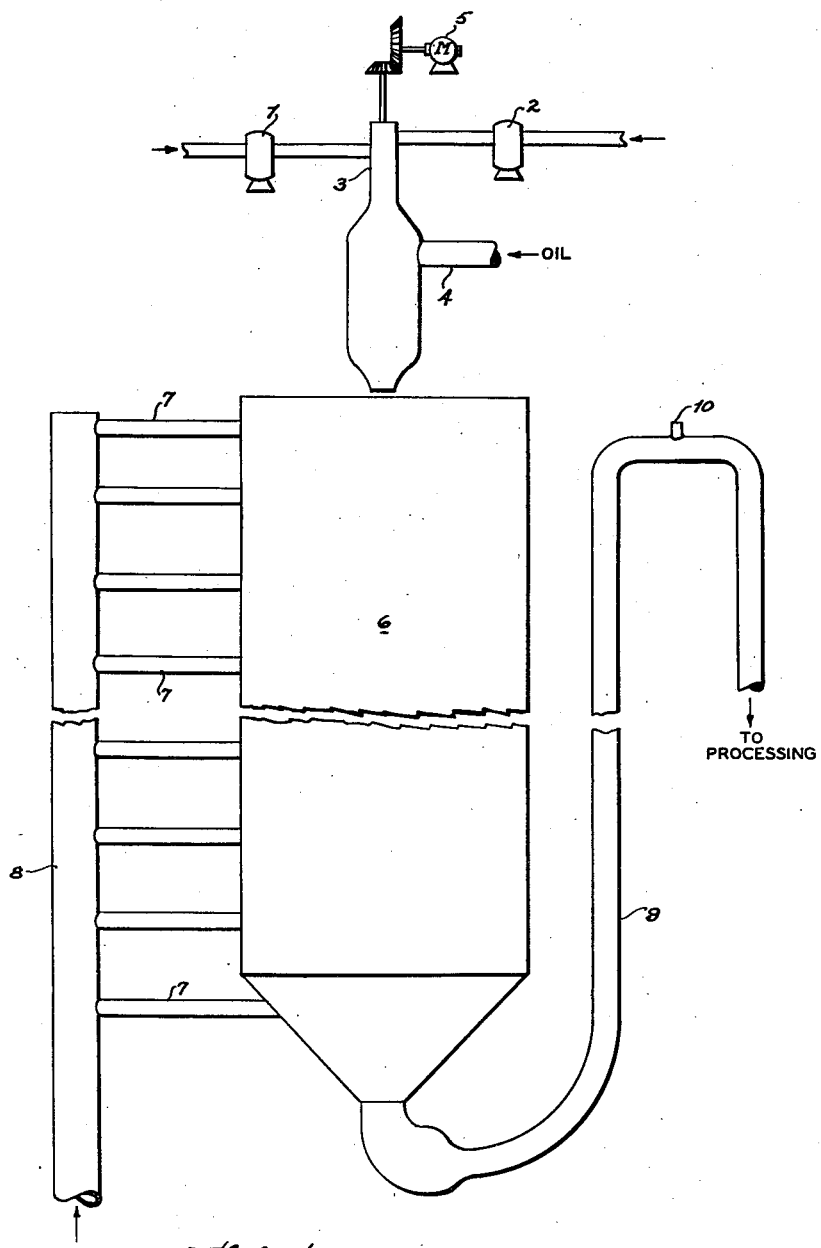

Nov. 7, 1950 — M. M. MARISIC — 2,528,767
PROCESS OF DRYING INORGANIC OXIDE GELS
Filed Sept. 14, 1945 — 2 Sheets-Sheet 1

INVENTOR
Milton M. Marisic
BY Oswald G. Hayes
ATTORNEY

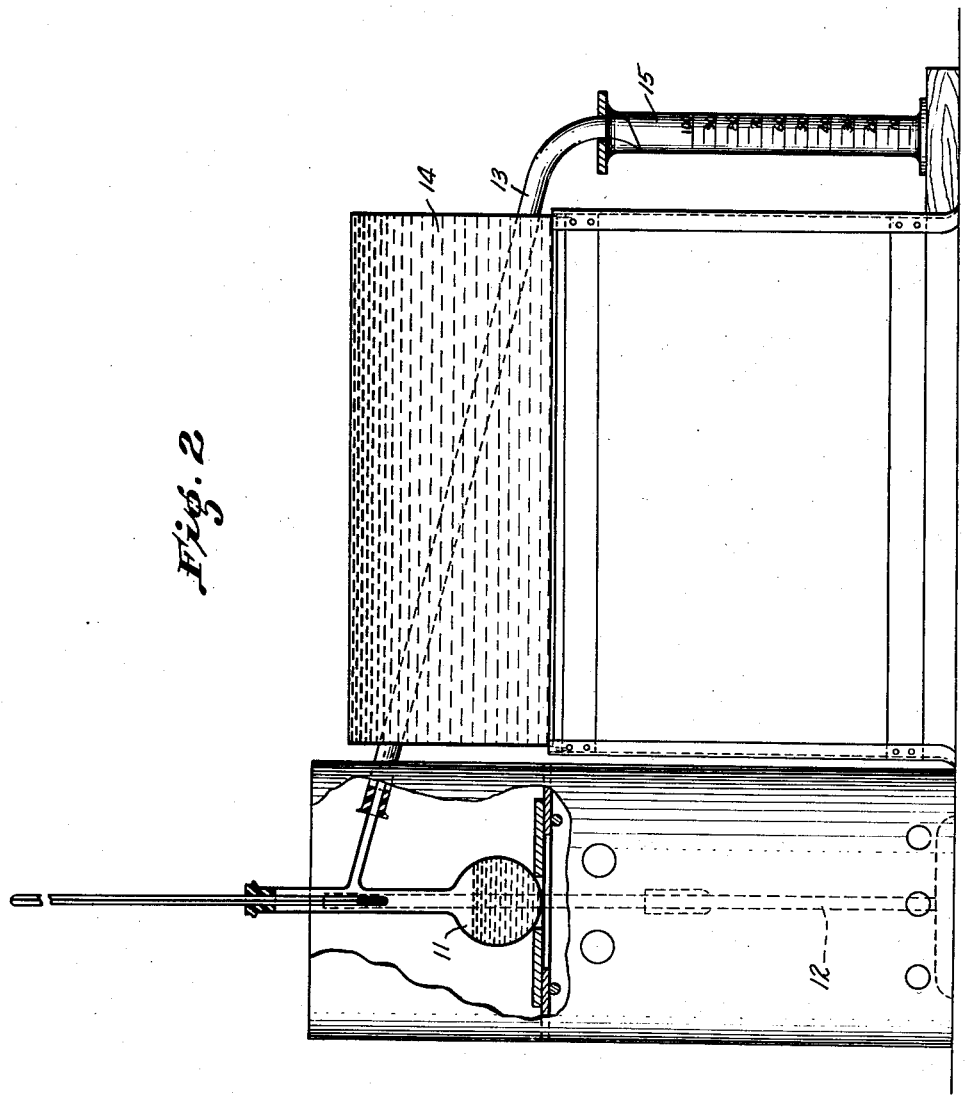

Patented Nov. 7, 1950

2,528,767

UNITED STATES PATENT OFFICE 2,528,767

PROCESS OF DRYING INORGANIC OXIDE GELS

Milton M. Marisic, Northfield, Ill., assignor to Socony-Vacuum Oil Company, Incorporated, a corporation of New York Application September 14, 1945, Serial No. 616,339

6 Claims. (Cl. 252—448)

This invention is directed to a process for preparing spheroidal particles and other predetermined shapes of inorganic oxide gels and is particularly concerned with an improved method of drying the gel spheroids described and claimed in my copending application Serial No. 590,071, filed April 24, 1945, now Patent Number 2,384,946, patented September 18, 1945. This application is a continuation-in-part of my copending application Serial No. 529,825, filed April 6, 1944.

My said prior applications describe methods of making spheroidal inorganic oxide gel pellets by introducing portions of an inherently gelable hydrosol to a fluid medium immiscible therewith. In that medium the portions of sol assume spheroidal shape by reason of surface tension against the fluid medium and the sol globules are retained in the medium until they set to firm spheroids of hydrogel. The spheroids are then dried to yield hard, porous, adsorbent spheroids suitable for various uses to which inorganic oxide gels are adapted, such as catalytic cracking of heavy petroleum fractions to gasoline, polymerization, alkylation, desulfurization, decolorizing, drying and the like. The hydrogel may be prepared for use in zeolytic base exchange reactions by drying to a limited extent, thus leaving considerable water in the pores of the gel, but shrinking the gel to a form which is firmer and less subject to losses in handling. A feature of primary importance with respect to the spheroidal gel particles so formed is the smooth surfaces provided by so handling the gel through gelation and drying steps that the surfaces bounding the gel at the time of formation are retained in the final product. These surfaces are smooth as contrasted with the surfaces resulting from breakage of the gel, either as hydrogel or as dried gel. The latter surfaces are characteristic conchoidal fractures, strikingly similar to the surfaces obtained by breaking glass.

Particles of gel having similarly smooth surfaces are formed by gelling the sol in lubricated molds and thereafter drying while retaining original gelation surfaces. In the latter case, it is sometimes desirable to form the gel as rods and break the rods transversely to provide short cylinders. In that case, the ends of the cylinders show the characteristic conchoidal fracture but the major portion of the total surface of the dried gel corresponds to original gelation surfaces.

It has been found that hydrogel particles sometimes tend to adhere to each other at surfaces of contact when allowed to stand as a mass shortly after gelation. With fairly large globules, such as those having diameters on the order of ½ inch formed by injecting the sol to a body of gas oil, this problem is not very important for most uses. However, where extremely low attrition losses are desirable, the small tips retained by some globules on separation tend to break off and adversely affect the suitability of the gel. For example, heat sensitive pastes and solids may be dried by rolling with dry gel spheroids and the dried product separated by screening. Small pieces of gel broken from the spheroids pass the screen and contaminate the product.

Smaller sizes of gel having gelation surfaces as the major boundaries are more subject to adherence. The small gel globules formed by dispersing a sol in benzene or other immiscible liquid tend to agglomerate rather badly when fresh. Even more difficulty is suffered in the case of sol sprayed into air at a temperature below the boiling point. If the gelation time and depth of the air column are properly coordinated to permit gelation before the sol drops reach a solid or liquid surface, fine hydrogel spheroids are formed which, when dry, will pass a 100-mesh screen. When freshly formed, these globules tend to agglomerate in large clusters when immersed in water or standing in air. The tendency to agglomerate grows somewhat less as the gel ages but is a strong factor for some time after formation.

It has been found that the smooth surfaced gels having a major portion of their surface made up of original gelation surfaces may be handled without appreciable difficulty due to adherence and agglomeration by partially drying the particles while immersed in a water immiscible liquid. The extent of drying necessary for the purpose will vary according to the chemical composition and history of the gel, but in general, about 50% or more of the water content should be removed while the gel is immersed in a water immiscible liquid. The extent of water removal may be determined from measurement of condensed water vapor decanted from water immiscible liquid condensate or by observation of change in volume or density of the gel as it shrinks during drying.

The drying in the water immiscible liquid is generally somewhat in the nature of azeotropic distillation of water from the gel and vapor pressure of the drying liquid is an item of economic importance. If the vapor pressure of the drying liquid is very low at the temperature of drying, very little of the liquid will be evaporated and the same will act primarily as a means to inhibit adherence of gel particles and as a heat transfer medium. If the vapor pressure of the liquid is high at the drying temperature, the drying will proceed principally by azeotropic distillation and the amount of liquid evaported will depend on the vapor pressure of the liquid. A very high vapor pressure of the liquid will result in uneconomical operation because the amount of liquid evaporated will be too high, thus unnecessarily increasing the costs for heating and for liquid recovery. To keep the costs within desirable limits, it is preferred that the vapor pressure of the liquid be not more than about twice that of water at the drying temperature. In order to obtain azeotropic distillation, it is preferred that the vapor pressure of the drying liquid be not less than about one-half that of water at the drying temperature. Benzene is found to be an admirably suitable drying liquid. The gel particles should be covered with the drying liquid throughout that portion of the drying which is conducted in accordance with the present invention.

Drying according to this invention causes shrinkage of the gel to about the same extent as drying in air, thus drying completely will result in a product which occupies about one-fourteenth the volume occupied by the original gel. The drying by immersion in a heated liquid may be discontinued at a suitable point and the remainder of the water removed by any of the known methods so long as care is taken not to cause undue breakage. Thus, if the use of the product will permit of some breakage, drying of the gel may be completed in a current of heated air, say at 250° F. Breakage losses may be greatly reduced by drying with a current of superheated steam. Alternatively, further shrinkage of the gel may be prevented by completing the drying in accordance with the "aerogel" technique, wherein the aqueous phase of the gel is replaced by an organic liquid and the new liquid phase is removed at a temperature above the critical of the organic liquid. By this type of operation, the invention produces pellets of lower apparent density than those obtained by air drying or other means which causes shrinkage of the gel during drying.

It is therefore a principal object of this invention to provide means for drying smooth surfaced hydrogel particles by heating in a water immiscible liquid until at least about 50% of the water content thereof is removed and thereafter completing drying to the desired extent by any suitable means.

Further objects and advantages of the invention will become apparent from the following detailed description of preferred embodiments of the invention and of an apparatus for continuous operation preparing small pellets as illustrated diagrammatically in Figure 1 of the annexed drawing. Figure 2 is an illustration of a suitable distillation assembly for drying small gel pellets according to the invention.

Referring specifically to Figure 1 of the drawing, equipment is shown for continuous formation of small beads of hydrogel, for example, silica-alumina hydrogel. A water-glass solution, supplied at a predetermined rate by pump 1 and an acid solution, supplied by pump 2 at a predetermined rate are mixed in a mixing chamber 3 to form a gelable sol having a predetermined short gelation time. A water-soluble aluminum compound is dissolved in one of the solutions in an amount to give the desired silica-alumina ratio in the finished product. For example, aluminum sulfate may be dissolved in the acid solution and/or sodium aluminate in the water glass. The sol so formed passes to a lower enlarged portion of the chamber 3 in which it is intimately agitated with a water-immiscible liquid supplied by pipe 4 such as a hydrocarbon oil to form an emulsion of sol in oil.

A suitable mixing of sol and oil may be accomplished by a mechanical agitator in chamber 3 driven by a motor 5.

The resulting emulsion is discharged into a vessel 6 of water-immiscible liquid which is preferably identical with that supplied by pipe 4 to chamber 3. The body of liquid in chamber 6 is preferably agitated to inhibit coalescence of the dispersed sol. Such agitation may be by mechanical means or by means of jets of oil injected at a plurality of points. For example, oil may be introduced by a plurality of pipes 7 from a header 8. The manner in which the streams from pipes 7 enter the body of liquid in vessel 6 will be determined by well-known principles depending upon shape and size of the vessel 6.

As the dispersed sol passes through vessel 6 downwardly, the small droplets of sol set to a firm hydrogel and are removed by pipe 9 in the stream of oil flowing therein from the vessel 6. Pipe 9 is preferably of goose-neck form having a vent 10 as shown in order to maintain the desired liquid level in vessel 6.

The small gel pellets are preliminarily dried in a conventional distilling apparatus assembly as shown in Figure 2. The hydrogel pellets, together with a suitable water immiscible liquid, are introduced to a distilling flask 11 and heat is applied, as by burner 12. Mixed vapors of water and the water immiscible liquid pass from the flask into a condenser 13 in bath 14 and the condensed liquid discharges into graduated cylinder 15. The amount of water removed is readily determined by reading the cylinder at the interface between condensed water and condensed water immiscible liquid.

The apparatus above described may be utilized for the manufacture of catalysts comprising silica and beryllia. It may be noted that such catalysts may also be manufactured by the processes of my prior applications noted above. The plural oxide gels comprising beryllia prepared by the present process or by the processes of my prior applications are hard particles having smooth surfaces composed of smooth curves and an internal structure substantially that of a hydrogel from which the aqueous phase has been removed. Such gels comprise a major proportion of silica and a minor amount of beryllia; furthermore, these gels may contain minor quantities of oxides of the third and fourth groups of the periodic table, such as $Al_2O_3$, $ThO_2$, $ZrO_2$, $CeO_4$, $SnO_4$, etc.

These improved catalysts are suitable for hydrocarbon conversion processes involving the reactions of cracking, reforming, isomerization, polymerization, etc. In the polymerization of normally gaseous olefins, such as ethylene, propylene and butylenes, into higher molecular weight materials—especially to hydrocarbons boiling within the gasoline range—the plural oxide gels containing beryllia have been found to be extremely efficient as catalysts. Under proper reaction conditions, these catalysts function to isomerize selectively normal olefinic hydrocarbons to iso-olefinic compounds. For example, normal butenes can be isomerized to high yields of isobutene. Normal paraffinic hydrocarbons as normal pentane may be isomerized to isopentane. These gel catalysts are especially adapted to accelerate the cracking of heavy fractions of petroleum and to reform lighter fractions, such as gasoline, so as to increase the rate of production of high anti-knock gasoline.

The plural oxide gels comprising beryllia are prepared by mixing a sodium-silicate solution of the proper concentration with an acid solution containing an acid and a beryllium salt together with other salts of the elements of the third and fourth groups of the periodic table when the latter are desired. The solutions are mixed under such conditions that a hydrosol forms without substantial precipitation and that this hydrosol will have a pH between 2.5 and 10, and preferably between pH 5 and 8.5. After a short period of time as, for example, a few seconds, a few minutes or longer, but preferably in less than 30 minutes, the hydrosol should set to a gel. The gel thus formed is defined as a hydrogel. This hydrogel is washed, dried and heat treated according to methods described herein.

An alternative method of mixing the solutions to form the hydrosol consists of adding sodium beryllate or other alkaline solutions like sodium aluminate to the sodium-silicate solution and then adding the resulting solution to an acid solution while the latter is efficiently agitated. This procedure is essential when it is desired to prepare gels containing high concentrations of beryllia, alumina and the other oxides mentioned above so as to avoid precipitation. Acid hydrosols may be neutralized with buffer salts, such as ammonium acetate, to hasten gelation and avoid precipitation.

The hydrosol may also be formed by concurrent-flow mixing of the two solutions. The time of gelation of the hydrosol is dependent upon temperature, concentration of reactants and acidity. At constant pH and fixed concentration of reactants, increasing the temperature of the reactant solutions decreases the time of gelation, while lowering temperature (below room temperature) increases gelation time. At constant pH and temperature, decreasing the concentration of the reactants by dilution with water increases the gelation time with increasing dilution. Increasing the pH by utilizing less acid while the concentration of the other reactants is maintained constant, results in a decrease in the time of gelation. Conversely, decreasing the pH by employing more acid, increases the gelation time. For commercial operations, it is desirable to prepare hydrogels containing the largest amount possible of insoluble oxides. From the above description, it is apparent that the most concentrated hydrogels are prepared at temperatures around 32° F., pH equal to 5 (since this is preferred) and at such concentrations of reactant solutions that a gelation time of a few seconds is obtained.

EXAMPLE I

*Silica-beryllia gel. 90% $SiO_2$, 10% BeO (on dry basis)*

Two-hundred and fifty-four cc. of a sodium-silicate solution containing 0.213 gram of $SiO_2$ per cc. (prepared by diluting "N" brand sodium silicate) was added to a well-agitated acid solution containing 119.9 cc. of beryllium-nitrate solution, having an oxide concentration of 0.05 gram of BeO per cc., 50.8 cc. of 3.78 normal hydrochloric acid, and 1575 cc. of distilled water. This hydrosol set to a clear firm gel in one hour and fifteen minutes at room temperature or in one minute at 95° C. The pH of the hydrosol was 4.6.

Beads may be formed from this hydrosol by agitating it efficiently with oil at a temperature such that the temperature of the dispersion will be 95° C. The whole is then discharged in an agitated body of oil as shown in the drawing. The hydrogel globules obtained by gelation in oil are covered with benzene and heated to evaporate water by azeotropic distillation to give gel particles of 50% of the original weight. The gel is then washed free of nitrate and chloride ions by decantation with distilled water and freed of sodium ions by base exchanging with 5% ammonium chloride solution. The hydrogel was at this point again water washed free of chloride ion, and dried, the temperature being gradually raised to 1050° F. The gel was maintained at the latter temperature for five hours prior to testing as a cracking catalyst.

EXAMPLE II

*Preparation of silica-beryllia-alumina catalyst 90% $SiO_2$, 7% BeO, 3% $Al_2O_3$ (on dry basis)*

Two-hundred and fifty-six cc. of sodium silicate solution, of the concentration used in Example I, was added to a well-agitated acid solution containing 84.8 cc. of beryllium-nitrate solution having an oxide concentration of 0.05 gram of BeO per cc., 43.2 cc. of aluminum-sulfate solution of strength equivalent to 0.042 gram of $Al_2O_3$ per cc., 21.6 cc. of 3.78 normal hydrochloric acid, and 1600 cc. of distilled water. This hydrosol set to a clear firm gel in about four minutes at room temperature or in one minute at 50° C. The pH of the hydrosol was 6.5.

Hydrogel globules obtained from this hydrosol were partially dried, washed, base exchanged and finally dried as described in Example I.

EXAMPLE III

*Silica-beryllia-zirconia catalyst 85% $SiO_2$, 10% BeO, 5% $ZrO_2$ (on dry basis)*

To 594 cc. of water-glass solution of the concentration used in Example I were added 960 cc. of distilled water. This solution was added to a well-agitated solution containing 168 cc. of zirconium-sulfate solution, having an oxide concentration of 0.045 gram of $ZrO_2$ per cc., and 900 cc. of 4.042 normal hydrochloric acid. To this solution was added 300 cc. of sodium-beryllate solution containing 0.05 gram of BeO per cc. prepared by dissolving 101.3 grams of sodium hydroxide (95%) in 300 cc. of a beryllium-nitrate solution made up to contain 0.05 gram of BeO per cc. Six-hundred cc. of an 8 normal solution of ammonium acetate was then added, care being taken to avoid too violent agitation, otherwise excessive foaming will result. This hydrosol set to a clear firm gel in ten minutes at room temperature or in one minute at 65° C. The pH of the hydrosol was 5.2.

Hydrogel globules obtained from this hydrosol were partially dried, washed and finally dried as described in Example I.

EXAMPLE IV

*Silica-beryllia-thoria catalyst 75% $SiO_2$, 10% BeO, 15% $ThO_2$ (on dry basis)*

Three-hundred and sixty cc. of water-glass solution, containing 0.208 gram of $SiO_2$ per cc. (prepared by diluting "N" brand sodium silicate) was added to a well-agitated acid solution containing 500 cc. of 4.042 normal hydrochloric acid, 300 cc. of thorium-nitrate solution containing 0.05 gram of $ThO_2$ per cc., and 240 cc. of distilled water. To this hydrosol, 200 cc. of a freshly-prepared solution of sodium beryllate, containing 0.05 gram of BeO per cc., was then added, with rapid stirring, followed by 400 cc. of 8 normal ammonium acetate, with moderate stirring to prevent excessive foaming. The resulting hydrosol set to a clear, firm gel in 2 minutes at 15° C. or in 30 seconds at 25° C. having a pH of 5.5.

Gel prepared according to the above directions has a total oxide concentration, based on the weight of freshly-formed hydrogel of 5%, of which 75% is $SiO_2$, 10% BeO and 15% $ThO_2$.

Hydrogel globules prepared from the above hydrosol were partially dried, washed and finally dried as described in Example I.

EXAMPLE V

*Silica-beryllia-zirconia catalyst 80% $SiO_2$, 10% BeO, 10% $ZrO_2$ (on dry basis)*

Three-hundred and eighty-five cc. of water-glass solution of the concentration used in Example IV was added to a well-agitated acid solution containing 600 cc. of 4.042 normal hydrochloric acid, 100 cc. of zirconium-sulfate solution containing 0.10 gram of $ZrO_2$ per cc. and 315 cc. of distilled water. To this hydrosol, 200 cc. of a freshly-prepared solution of sodium beryllate, containing 0.05 gram of BeO per cc., was then added, with rapid stirring, followed by 400 cc. of 8 normal ammonium acetate, with moderate stirring to prevent excessive foaming. The resulting hydrosol set to a clear, firm gel in 7 minutes at 25° C. or in 45 seconds at 35° C. having a pH of 5.2.

Gel prepared according to the above directions has a total oxide concentration, based on the weight of freshly-formed hydrogel of 5%, of which 80% is $SiO_2$, 10% BeO and 10% $ZrO_2$.

Hydrogel globules prepared from the above hydrosol were partially dried, washed and finally dried as described in Example I.

EXAMPLE VI

*Silica-beryllia-alumina catalyst 88% $SiO_2$, 7% BeO, 5% $Al_2O_3$, (on dry basis)*

Solution A was prepared by adding 411 cc. of a water-glass solution containing 0.214 gram of $SiO_2$ per cc. (prepared by diluting "N" brand sodium silicate) to 600 cc. of 4.042 normal hydrochloric acid, with rapid stirring.

Solution B was prepared by mixing 140 cc. of sodium-beryllate solution, containing 0.05 gram BeO per cc. with 166 cc. of sodium aluminate solution, containing 0.03 gram $Al_2O_3$ per cc.

Solution B was then added to solution A, the two being thoroughly mixed until a clear solution having a pH of 1.7 was obtained. Finally, 400 cc. of 8 normal ammonium acetate was blended in with moderate stirring to avoid excessive foaming. The resulting hydrosol set to a clear, firm gel in 10 minutes at 19° C. or 30 seconds at 35° C., having a pH of 5.5.

Gel prepared according to the above directions has a total oxide concentration, based on the weight of freshly-formed hydrogel of 5.8%, of which 88% is $SiO_2$, 7% BeO and 5% $Al_2O_3$.

Hydrogel globules prepared from the above hydrosol were partially dried, washed and finally dried as described in Example I.

The catalysts described in the above examples were tested in the cracking of a fraction of Oklahoma City gas oil having a boiling range from 470° F. to 708° F. The oil vapors were conducted through the catalyst bed at 800° F. and at a liquid space velocity of 1.5 for 20-minute periods between regenerations. Results of these tests are tabulated below. Cracking activity is defined as the volume per cent conversion of the oil charged to 410° F. endpoint gasoline.

| Example | Catalyst Composition on dry basis | Cracking Activity |
|---|---|---|
| I | 10% BeO, 90% $SiO_2$ | 30 |
| II | 7% BeO, 3% $Al_2O_3$, 90% $SiO_2$ | 36 |
| III | 10% BeO, 5% $ZrO_2$, 85% $SiO_2$ | 43 |
| IV | 10% BeO, 15% $ThO_2$, 75% $SiO_2$ | 41 |
| V | 10% BeO, 10% $ZrO_2$, 80% $SiO_2$ | 52 |
| VI | 7% BeO, 5% $Al_2O_3$, 88% $SiO_2$ | 48 |

EXAMPLE VII

A solution of sodium silicate containing 105 grams of $SiO_2$ per liter was prepared by diluting "N" brand sodium silicate (28.7% $SiO_2$, 8.9% $Na_2O$). This solution was mixed in chamber 3 with a second solution containing 34.10 grams of $Al_2(SO_4)_3$ and 25.05 grams of $H_2SO_4$ per liter at the ratio of 1.00 volumes of the former solution to 0.780 volume of the latter. The resultant hydrosol was agitated with gas oil in chamber 3 and introduced to vessel 6 containing a dispersion of the hydrosol in gas oil. The small globules so formed were partially dried, washed and finally dried as described above.

EXAMPLE VIII

A silica-alumina hydrosol was prepared from the following reagents:

200 cc. sodium-silicate solution, 0.105 gram $SiO_2$ per cc., (prepared by diluting "N" brand sodium silicate) was added to an acid solution containing 21.1 cc. of 3.797 normal hydrochloric acid, 39.6 cc. of aluminum sulfate solution (containing 0.042 gram $Al_2O_3$ per cc.) and 120 cc. of water, with efficient agitation to form a sol which immediately was poured into a container of kerosene while the latter was stirred vigorously by means of a mechanical device. The agitation of the kerosene subdivided the sol into small droplets which set to hydrogel. The gelation time of the hydrosol was 30 seconds. The kerosene was drained from the hydrogel particles and replaced by benzene. This mixture of benzene and hydrogel particles was transferred to a distillation unit, wherein the hydrogel beads were partially dried by azeotropic distillation to a water content of about 50%. The gel particles were washed with water until free of soluble salts, base exchanged with $NH_4Cl$ solution, washed with water again and dried at 180° F. to constant weight. The drying of the gel spheroids was continued at gradually increasing temperatures up to 1100° F. at which temperature the gel was maintained for five hours.

The major portion of the dry gel was in the form of spheroids of 80 mesh size and smaller. These small particles were found to be excellent cracking catalysts for the process in which the catalyst is suspended in the hydrocarbon vapor.

EXAMPLE IX

Pellets having diameters of about one-half inch in the hydrogel form were prepared in apparatus having a mixing nozzle above a tank which contained a column of Oklahoma City gas oil having a boiling range of 471° to 708° F. and a specific gravity of 0.846. Means were provided to flow water across the bottom of the tank and up through a vented gooseneck, all substantially as described in my said Patent Number 2,384,946.

A solution of sodium silicate containing 105 grams of $SiO_2$ per liter was prepared by diluting "N" brand of sodium silicate (28.7% $SiO_2$, 8.9% $Na_2O$). This solution was mixed with a second solution containing 34.10 grams of $Al_2(SO_4)_3$ and 25.05 grams of $H_2SO_4$ per liter at the ratio of 1.00 volumes of the former solution to 0.780 volumes of the latter. The resulting colloidal solution leaving the mixer was introduced into the top of the column of gas oil whose depth was eight feet. The globules fell through the oil and gelled before passing into the layer of water located beneath the oil. The gel in globular form was conducted out of the bottom of the column in a stream of water and immediately immersed in normal heptane, wherein it was heated to remove a portion of the water and thereafter washed, base exchanged and dried.

For purposes of comparison, a similar hydrogel product in bead form was prepared and processed in the manner known prior to the present invention. The globules as sluiced from the forming column were washed and base exchanged. They were then dried slowly and uniformly at 180° F. until shrinkage was substantially complete. The drying was continued at gradually increasing temperature to 1050° F., at which temperature it was maintained for two hours. The two products were very similar and, for such purposes as catalytic cracking wherein small amounts of fines are tolerable, fully equivalent. The product which had been partially dried in heptane was substantially free of the occasional small nicks and protuberances found on the other product.

EXAMPLE X

An acid solution was prepared by mixing 3.5 parts by weight of sulfuric acid (100% concentration), 7.9 parts by weight of commercial iron-free aluminum sulfate containing 15 mols of water per mol of salt, and 88.6 parts by weight of distilled water. A dilute water glass solution was prepared by mixing 44.7 parts by weight of distilled water and 55.3 parts by weight of "N" brand sodium silicate (28.7% $SiO_2$, 8.9% $Na_2O$). These solutions were mixed in a nozzle mixer in the ratio of 137 volumes of acid to 150 volumes of water glass, thus forming a sol which sets in less than one second to a firm hydrogel containing 10 grams of silica and alumina per 100 grams of gel. Immediately upon mixing, the sol was ejected at room temperature through an orifice into an enlarged vessel containing air at room temperature. The spray thus formed set to small spheroids of hydrogel which were collected in a pool of water at the bottom and after removal were washed, base exchanged and dried. One portion was dried in air and the other partially dried in heptane, as in Example IX. The portion that was dried in air was found to agglomerate rather badly but this difficulty was largely avoided by drying in the organic liquid. Even better results were achieved by substituting oil for the pool of water in which the gelled globules are collected.

EXAMPLE XI

Hydrogel beads, formed according to Example I, after drying by azeotropic distillation but before further drying were covered with denatured ethyl alcohol. The alcohol was drained and replaced with fresh alcohol four times at intervals of two days, after which the "alcogel" together with sufficient alcohol to cover it was transferred to a 3-liter pressure autoclave with a glass liner. The autoclave was heated to 540–560° F. and vaporized alcohol was slowly vented from about 1400 p. s. i. to atmospheric pressure at the same temperature. The autoclave was then evacuated at about 1 mm. of mercury, absolute, for ninety minutes and finished beads of low apparent density discharged from the autoclave.

EXAMPLE XII

Larger hydrogel beads of reduced water content produced by the process of Example IX through azeotropic distillation were further dried by replacing water with alcohol and removing the alcohol at high pressure as described in Example XI.

EXAMPLE XIII

Very small beads of low density were prepared by treating azeotropically dried beads such as those described in Example X according to the final drying step of Example XI.

I claim:

1. A process for drying inorganic oxide hydrogel pellets which are bounded principally by smooth surfaces formed at gelation and which have not previously been dried to any substantial extent, which comprises immersing said pellets in a water immiscible liquid, heating the said liquid to the azeotropic distillation temperature of the aqueous phase of the gel and said liquid, continuously heating said liquid at said temperature for a period of time sufficient to evaporate at least about 50% of the aqueous phase of said gel, but less than that which causes maximum shrinkage of the gel, washing the partially dried gel with water to remove water soluble impurities, and thereafter completing the drying of said pellets to the desired extent, whereby the tendency of said pellets to adhere and agglomerate is substantially reduced.

2. A process for drying inorganic oxide hydrogel pellets which are bounded principally by smooth surfaces formed at gelation and which have not previously been dried to any substantial extent, which comprises immersing said pellets in a water immiscible liquid, heating the said liquid to the azeotropic distillation temperature of the aqueous phase of the gel and said liquid, continuously heating said liquid at said temperature for a period of time sufficient to evaporate at least about 50% of the aqueous phase of said gel, but less than that which causes maximum shrinkage of the gel, washing the partially dried gel with water to remove water soluble impurities, and thereafter completing the drying of said pellets to the desired extent, whereby the tendency of said pellets to adhere and agglomerate is substantially reduced, said liquid having a vapor pressure not less than half nor more than twice that of water at said drying temperature.

3. A process for drying inorganic oxide hydrogel pellets which are bounded principally by smooth surfaces formed at gelation and which have not previously been dried to any substantial extent, which comprises immersing said pellets in a water immiscible liquid, heating the said liquid to the azeotropic distillation temperature of the aqueous phase of the gel and said liquid, continuously heating said liquid at said temperature for a period of time sufficient to evaporate at least about 50% of the aqueous phase of said gel, but less than that which causes maximum shrinkage of the gel, removing the gel pellets from said liquid, replacing the aqueous phase thereof with an organic liquid, and thereafter completing drying of said pellets at a temperature not below the critical temperature of said organic liquid.

4. A process for drying inorganic oxide hydrogel pellets which are bounded principally by smooth surfaces formed at gelation and which have not previously been dried to any substantial extent, which comprises immersing said pellets in a water immiscible liquid, heating the said liquid to the azeotropic distillation temperature of the aqueous phase of the gel and said liquid, continuously heating said liquid at said temperature for a period of time sufficient to evaporate at least about 50% of the aqueous phase of said gel, but less than that which causes maximum shrinkage of the gel, removing the gel pellets from said liquid, replacing the aqueous phase thereof with an organic liquid, and thereafter completing drying of said pellets at a temperature not below the critical temperature of said organic liquid, said water immiscible liquid having a vapor pressure not less than half nor more than twice that of water at said drying temperature.

5. A process for drying inorganic oxide hydrogel pellets which are bounded principally by smooth surfaces formed at gelation and which have not previously been dried to any substantial extent, which comprises immersing said pellets in benzene, heating the said benzene to the azeotropic distillation temperature of the aqueous phase of the gel and said liquid, continuously heating said liquid at said temperature for a period of time sufficient to evaporate at least about 50% of the aqueous phase of said gel, but less than that which causes maximum shrinkage of the gel, washing the partially dried gel with water to remove water soluble impurities, and thereafter completing the drying of said pellets to the desired extent, whereby the tendency of said pellets to adhere and agglomerate is substantially reduced.

6. A process for drying inorganic oxide hydrogel pellets which are bounded principally by smooth surfaces formed at gelation and which have not previously been dried to any substantial extent, which comprises immersing said pellets in heptane, heating the said heptane to the azeotropic distillation temperature of the aqueous phase of the gel and said liquid, continuously heating said liquid at said temperature for a period of time sufficient to evaporate at least about 50% of the aqueous phase of said gel, but less than that which causes maximum shrinkage of the gel, washing the partially dried gel with water to remove water soluble impurities, and thereafter completing the drying of said pellets to the desired extent, whereby the tendency of said pellets to adhere and agglomerate is substantially reduced.

MILTON M. MARISIC.

REFERENCES CITED

The following references are of record in the file of this patent:

UNITED STATES PATENTS

| Number | Name | Date |
| --- | --- | --- |
| 1,687,588 | Pearson | Oct. 16, 1928 |
| 1,813,272 | Biltz | July 7, 1931 |
| 2,138,048 | Vesce | Nov. 29, 1938 |
| 2,188,007 | Kistler | Jan. 23, 1940 |
| 2,249,767 | Kistler | July 22, 1941 |
| 2,284,248 | Baker et al. | May 26, 1942 |
| 2,326,099 | Kokatnur et al. | Aug. 3, 1943 |
| 2,390,556 | Ruthruff | Dec. 11, 1945 |
| 2,459,903 | Voorhees | Jan. 25, 1949 |

FOREIGN PATENTS

| Number | Country | Date |
| --- | --- | --- |
| 222,279 | Great Britain | Oct. 2, 1924 |

Certificate of Correction

Patent No. 2,528,767                                               November 7, 1950

MILTON M. MARISIC

It is hereby certified that error appears in the printed specification of the above numbered patent requiring correction as follows:

Column 3, line 6, for "evaported" read *evaporated*; column 9, line 64, for the word "difficult" read *difficulty*; column 10, line 12, for "Larger" read *Large*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*